United States Patent [19]

Lanni et al.

[11] Patent Number: 5,394,268
[45] Date of Patent: Feb. 28, 1995

[54] FIELD SYNTHESIS AND OPTICAL SUBSECTIONING FOR STANDING WAVE MICROSCOPY

[75] Inventors: Frederick Lanni; D. Lansing Taylor; Brent Bailey, all of Pittsburgh, Pa.

[73] Assignee: Carnegie Mellon University, Pittsburgh, Pa.

[21] Appl. No.: 14,328

[22] Filed: Feb. 5, 1993

[51] Int. Cl.⁶ .............................................. G02B 21/06
[52] U.S. Cl. .................................... 359/386; 359/368
[58] Field of Search ................ 359/385, 386, 368, 722, 359/478; 356/4

[56] References Cited

U.S. PATENT DOCUMENTS

| | | | |
|---|---|---|---|
| 4,311,358 | 1/1982 | Gibbons | 359/385 |
| 4,621,911 | 11/1986 | Lanni et al. | 359/386 |

OTHER PUBLICATIONS

"Standing-Wave Fluorescence Microscopy" by Frederick Lanni, *Applications of Fluorescence in the Biomedical Sciences*, D. L. Taylor, A. S. Waggoner, R. F. Murphy, F. Lanni and R. R. Birge, eds., Alan R. Liss, Inc., New York, N.Y. 1986, pp. 505-521.

Proceedings Of The Spie: Los Alamos Conference On Optics, vol. 190, 23 May 1979, Los Alamos, N. Mex. US, P. A. Temple, "Improved Dark-field-like Surface Inspection Technique using Total Internal Reflection".

Soviet Patents Abstracts, Section EI, Week 9218, Derwent Publications Ltd., London, GB; Class S03, p. 4, AN 92148427 & SU,A 1,374,922 (As Sibe Bio-Phys) 30 Jul. 1991.

Applied Optics, vol. 20, No. 15, 1 Aug. 1981, New York, U.S., pp. 2656-2664, P. A. Temple, "Total Internal Reflection Microscopy: A Surface Inspection Technique".

*Primary Examiner*—Eugene R. LaRoche
*Assistant Examiner*—A. Zarabian
*Attorney, Agent, or Firm*—Buchanan Ingersoll

[57] ABSTRACT

In an improved optical microscope for observing a luminescent specimen, the specimen is excited by a time-multiplexed series of standing wave fields. Then an image of the specimen is recorded and displayed. This specimen can be incrementally moved and additional images can be created and combined. Images of the specimen can also be created when there are nodes or antinodes at the focal plane of the microscope. These images can also be combined to produce an improved image of the specimen.

30 Claims, 6 Drawing Sheets

FIELD SYNTHESIS AND OPTICAL SUBSECTIONING FOR STANDING WAVE MICROSCOPY

BACKGROUND OF THE INVENTION

The invention relates to luminescence optical microscopy and particularly to an apparatus and method for selectively optically illuminating particular zones in a specimen such as a biological cell or tissue.

FIELD OF INVENTION

Optical microscopy using fluorescence tagging for the determination of three-dimensional structure of cells and tissues is an important diagnostic and research procedure. There are a great number of dyes which can be attached to various structures within the cell. When excited by a particular wave length of light these dyes will fluoresce or phosphoresce. For example, several common dyes will emit a red glow when excited by green light. Hence, one can see structures to which a fluorescent dye is attached. The presence and location of the tagged structures can provide important diagnostic and structural information for basic research and clinical diagnostics.

Fluorescent imaging, in particular, is of vast utility in cell biology because of the high specificity of fluorescently labeled protein analogs, antibodies, hybridization probes, enzyme substrates, lipid analogs, and peptides, as well as stains. Fluorescence micrographs of extremely complicated objects such as intact cells typically show clearly the distribution of the tracer molecules, all other components being "invisible". The important optical characteristics of many biological specimens that allow for this simple interpretation of the image field is that cells are generally weakly refractive and weakly absorptive objects.

Conventional microscope images contain information about the 3-D structure of the object when the depth of field of the lens system is smaller than the axial dimension of the specimen. This means that in a single image, the axial location of a particular feature is encoded by its degree of defocus. A 3-D image data set, which is a "zero-order" estimate of the true structure of the object, is obtained by recording a series of images as the object is stepped through the focal plane of the microscope, a procedure known as optical sectioning microscopy (OSM). Each image is a spatially filtered axial projection of the object, and each generally contains in-focus and out-of-focus features. One of the central problems in 3-D microscopy is the removal of out-of-focus features from the 3-D image by optical and image processing methods thereby deriving a refined estimate of the true object.

In fluorescence microscopy there is a linear relationship between the emitter distribution in the object and the intensity distribution in the image field. This is caused by the mutual incoherence of fluorescence emission. Dye molecules in the specimen radiate independently so that the individual intensity fields are simply superimposed in the image-plane. It is possible to deconvolve the 3-D image to eliminate the out-of-focus portions. However, for the various methods that have been proposed there is a trade-off of recovery of high frequency structure for accuracy or stability.

The alternative to computational refinement of optical sectioning microscopy (OSM) is confocal scanning fluorescence microscopy (CSFM) in which direct optical spatial filtering is used to remove out-of-focus light waves from the detector field. In one version of this type of instrument fluorescence is excited in the specimen by a highly focused beam. In the image plane of the microscope a pin hole is placed at the point optically conjugate to the focal point of the beam and a high gain, low noise detector is placed behind the pin hole. The microscope acts as a spatial filter that detects efficiently only fluorescence photons that originate near the beam focus. 3-D image data is obtained by a raster scanning of the beam relative to the specimen, either optically or mechanically, and stepping the specimen axially through the focal plane to get stacked images. Confocal methods have several shortcomings. For example, such images often have a low signal to noise ratio. Hence, the resolution of the image is often severely compromised. Also, scanning usually is relatively slow, with scan times up to 64 seconds per frame for high signal-to-noise images. Indeed, there are many circumstances in which this technique cannot be utilized.

For fundamental reasons, a fluorescence microscope is more severely limited in axial (depth, or inter-image plane) resolution, as opposed to transverse (in the image plane) resolution. Consider a microscope with a lens having a high numerical aperture (NA) and a specimen of refractive index n illuminated by a light beam having a wavelength $\lambda$. The well-known Rayleigh resolution formula, $0.61\lambda/(NA)$, sets transverse resolution at about $0.2$ $\mu$m via direct imaging. This can be halved, in principle, by confocal scanning. In comparison, the axial equivalent of the Rayleigh formula $2n\lambda/(NA)^2$ is in the range 0.7–0.9 $\mu$m, typical for high-quality fluorescence OSM image sets. Computational image processing or confocal scanning can reduce this to 0.4–0.5 $\mu$m. A more restrictive analysis, the Rayleigh quarter-wave criterion $\lambda/8n \sin^2(\frac{1}{2} \sin^{-1} NA/n)$, gives a theoretical axial resolution in the range 0.13–0.17 $\mu$m for the best microscope lenses. This has been demonstrated in transmitted light microscopy, but not in fluorescence, due to the lack of mutual coherence in fluorescence imaging, and the generally lower signal-to-noise level. Therefore when the specimen contains fine stratified structural features, or simply when it is thinner than the depth-of-field, fluorescence OSM or even CSFM is unable to yield significant 3D information.

U.S. Pat. No. 4,621,911 discloses a method and apparatus called standing wave luminescence or fluorescence microscopy (SWFM) in which a specimen is illuminated in a fluorescence microscope by means of a standing wave field at the excitation wave length. This field is preferably produced by crossing two equal amplitude coherent beams from a laser. The direction of the beams is such that the nodal and anti-nodal planes in this field are parallel to the object plane of the microscope. Under this condition fluorescence is excited in laminar zones in the specimen, maximally at the location of each anti-nodal plane. One of these planes can be made coincident with the in-focus plane. In this way in-focus features of the specimen are made brightly fluorescent. Immediately adjacent out-of-focus features above and below the in focus plane are in nodal zones and are, therefore, only weakly fluorescent.

U.S. Pat. No. 4,621,911 teaches a theory and embodiments for creation and manipulation of a periodic standing wave field superimposed with the specimen in a fluorescence microscope, and that sets of images obtained by standing wave excitation contain Fourier coefficient information on the axial (depth) structure of the object down to an axial resolution limit of λ/4n, as small as 0.068 μm. The embodiments of the patent include several methods for producing a standing wave field crossing two equal-amplitude collimated s-polarized coherent beams at complementary angles relative to the axis of the microscope. These embodiments include the use of total internal reflection (TIR), a mirror or prism, or a wavelength-selective high reflector to fold a laser beam in-the specimen region of the microscope, independent coherent beams entering the specimen from opposite sides, or a re-entrant beam that first emerges from the objective lens into the specimen. The patent also includes embodiments where the nodal planes are not parallel to the object focal plane although the parallel condition is of principal interest here. Nevertheless, the method and apparatus of the '911 patent do not overcome the problems associated with the presence of out of focus luminescent portions in the image.

SUMMARY OF THE INVENTION

We provide improved methods and apparatus which overcome the out of focus problems and clearly display the transverse and axial position of luminescent structures in the specimen. As in the apparatus of U.S. Pat. No. 4,621,911, a fluorescence microscope is equipped with an optical system for standing wave excitation of the specimen. In a first present preferred method we manipulate a single standing wave field to show the axial structure of a specimen, even when the specimen is so thin that it is entirely within the depth-of-field of a high resolution microscope. We call this extension optical subsectioning, and have found a practical axial resolution limit of λ/8n (approximately 0.05 μm) in thin specimens. In a second present preferred embodiment a nonperiodic excitation field is generated in the specimen such that the excitation intensity is peaked only at the object focal plane. In this case, intersecting beams entering the specimen from opposite sides are swept in angle to generate a continuous series of standing wave fields that differ in node spacing, but all with an antinode at the object focal plane. A single image is recorded with the swept excitation, with the net result of the time-multiplexing being the preferential excitation of structures in the specimen that lie in the in-focus plane. This differs from the method of the 3 911 patent in that the net excitation field is peaked only at the in-focus plane, and not at evenly-spaced antinodal planes. We call this method excitation field synthesis (EFS) or field synthesis fluorescence microscopy (FSFM). It represents an extension of standing wave microscopy theory and practice to the high-aperture limit, where the depth-of-field of the optics is less than the axial dimension of the specimen.

In our method and apparatus we direct two beams, which can be a single beam reflected back through a specimen, to create distinct nodes and anti-nodes such as is taught in U.S. Pat. No. 4,621,911. We prefer to direct the beams through the lens of the microscope. In one embodiment the beam reflects directly back from a mirror positioned underneath the specimen. Alternatively, we use an active phase conjugator to generate the return or re-entrant beam in a standing wave illuminator. The phase conjugator generates the time-reversed version of the excitation beam that first passes through the specimen, so that a standing wave field of high spatial modulation is created, even in specimens where thee incoming planar wavefronts have been aberrated due to refractive index inhomogeneties. In another embodiment we use a beam splitter to create two beams from a single light source. The two beams preferably are directed to enter the specimen from opposite sides.

In yet another embodiment the specimen is illuminated in a manner previously discussed and an image of the specimen is recorded in a camera and stored. Then the specimen is moved a selected axial distance. Again the specimen is illuminated and a second image is created and stored. This-process can be continued until a desired number of images of the specimen are created. These images are then combined by image proccessing to produce one or more combined images of the specimen.

Other objects and advantages of the invention will become apparent from a description of the preferred embodiments shown in the figures.

PRINCIPLES OF OPERATION

Figure 1:
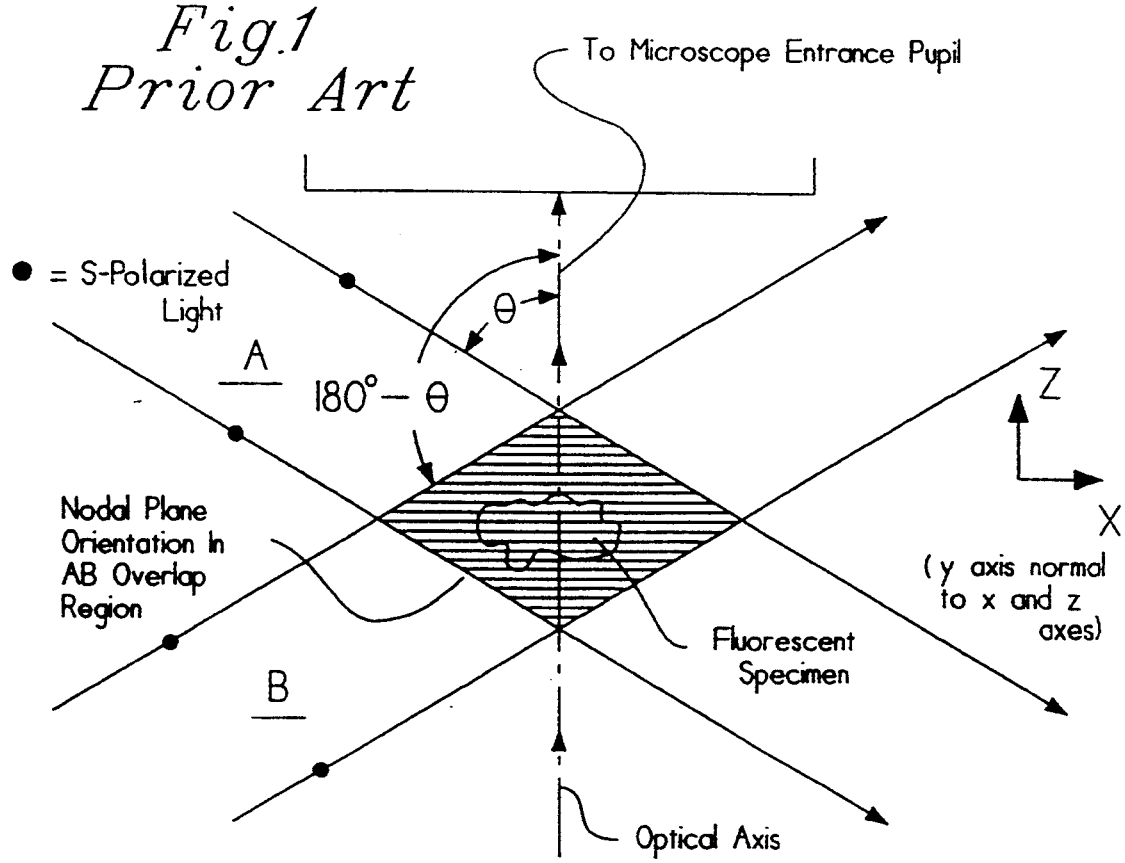
FIG. 1 is a schematic representation of the standing wave illumination of the prior art wherein a specimen is in a standing wave field of s-polarized light and on the optical axis of a microscope.

In a standing-wave microscope, two plane-wave fields from a laser are crossed at complementary angles in the specimen volume, where they interfere (FIG. 1). When the two fields are s-polarized and of equal amplitude, the resulting interference pattern has an electric field intensity that varies only axially, as $$I_{ex}(z) = I_0[1 + \cos(Kz + \Phi)]$$

where $K = (4\pi n/\lambda)\cos\theta$, $\lambda$ is the wavelength and $n$ is the specimen refractive index. Fluorescence is excited in the specimen in proportion to $I_{ex}(z)$. The nodes or antinodes, which are planes parallel to the focal plane, have a spacing $\Delta s = \lambda/2n \cos\theta$. By controlling the angle $\theta$, the node spacing can be varied down to a minimum value of $\lambda/2n$, when the two beams are counterpropagating along the axis of the microscope. By shifting the phase of one of the beams, the relative position of the antinodes within the specimen can be changed, at constant node spacing.

It is straightforward to estimate the axial resolution in SWFM. Two particles which are separated axially by half the node spacing can be illuminated alternately by shifting the phase of the standing wave pattern. With blue light excitation and a specimen refractive index of 1.33 (water) or higher, λ/4n is 0.09 μm or less. In practice, it has been possible to resolve particles separated axially by a quarter fringe (0.045 μm) in specimens where there is little overlapping structure. Because these distances are considerably less than the depth-of-field normally obtained in fluorescence microscopy, "optical subsectioning" is possible. That is, in thin specimens that fall entirely within the depth-Of-field of a high numerical aperture (NA) objective lens, axial structure can be observed purely by calibrated movement of an antinodal or nodal plane through the specimen, with no mechanical refocusing required. Even when the specimen is thick, discrete outlying structure may be discriminated by degree of defocus from in-focus features, so that optical subsectioning will still be useful. In mathematical terms, standing wave excitation is equivalent to axial modulation of the point spread function (PSF) which in turn is equivalent to shifting the optical transfer function (OTF) axially in reciprocal space by a distance equal to the spatial frequency of the standing wave field. This permits recovery of spatial frequency information that is absent or very heavily attenuated under incoherent excitation.

Optical subsectioning is a subtractive process in which a single standing wave field is manipulated to resolve the relative axial position of two or more stratified structures in a thin fluorescently labeled specimen. A thin specimen is one which lies entirely within the depth-of-field of the microscope and, strictly, within one node period of the standing wave field, 0.17 μm under typical conditions. In practice, the phase of the field is adjusted so that a nodal plane is coincident with one stratum. The structural features of that stratum then fluoresce only weakly, and an image is recorded that shows primarily the structures in other strata, i.e., a subtractive image. The nodal plane is then moved by a known distance to null the fluorescence from a neighboring stratum, and a complementary image is then recorded. In the simplest case, two structures that overlap in a conventional fluorescence image will each appear distinctly in two standing wave images, where a nodal plane is located first at one structure, and then the other.

A standing-wave microscope is, in fact, a type of interferometer in which the dye molecules in the specimen act as the primary detectors of the excitation field. In our original design (FIG. 2), total internal reflection was utilized to fold a collimated laser beam at the specimen cover glass to form the periodic field, which made the use of a high numerical aperture (NA) immersion lens difficult. This problem is solved by use of low-divergence gaussian beams propagating within the aperture of a high-NA lens, giving maximum resolution and light collection efficiency. In the simplest configuration (FIGS. 4 and 5), the beam 21 emerges from the lens 8, passes through the specimen 2, and is back-reflected by a closely-apposed mirror 16. One could use a phase conjugator in place of a mirror 16. The mirror is moved axially by a piezoelectric drive 14, which causes an equal axial shift of the excitation field planes through the specimen. The optics are adjusted so that the gaussian beam exiting the objective 8 contracts slightly to a large-diameter waist (150μm) at the mirror, 0.1–0.2 mm beyond the specimen. The standing wave field is then due to the superposition of the gaussian field and its reflection. In this condition, the nodal surfaces of the unperturbed standing wave field, although curved in principle, are flat to better than 1 part 20,000 over the field of view. Therefore, these surfaces are called nodal planes. Nodal planes are always parallel to the mirror in this system.

Figure 7:
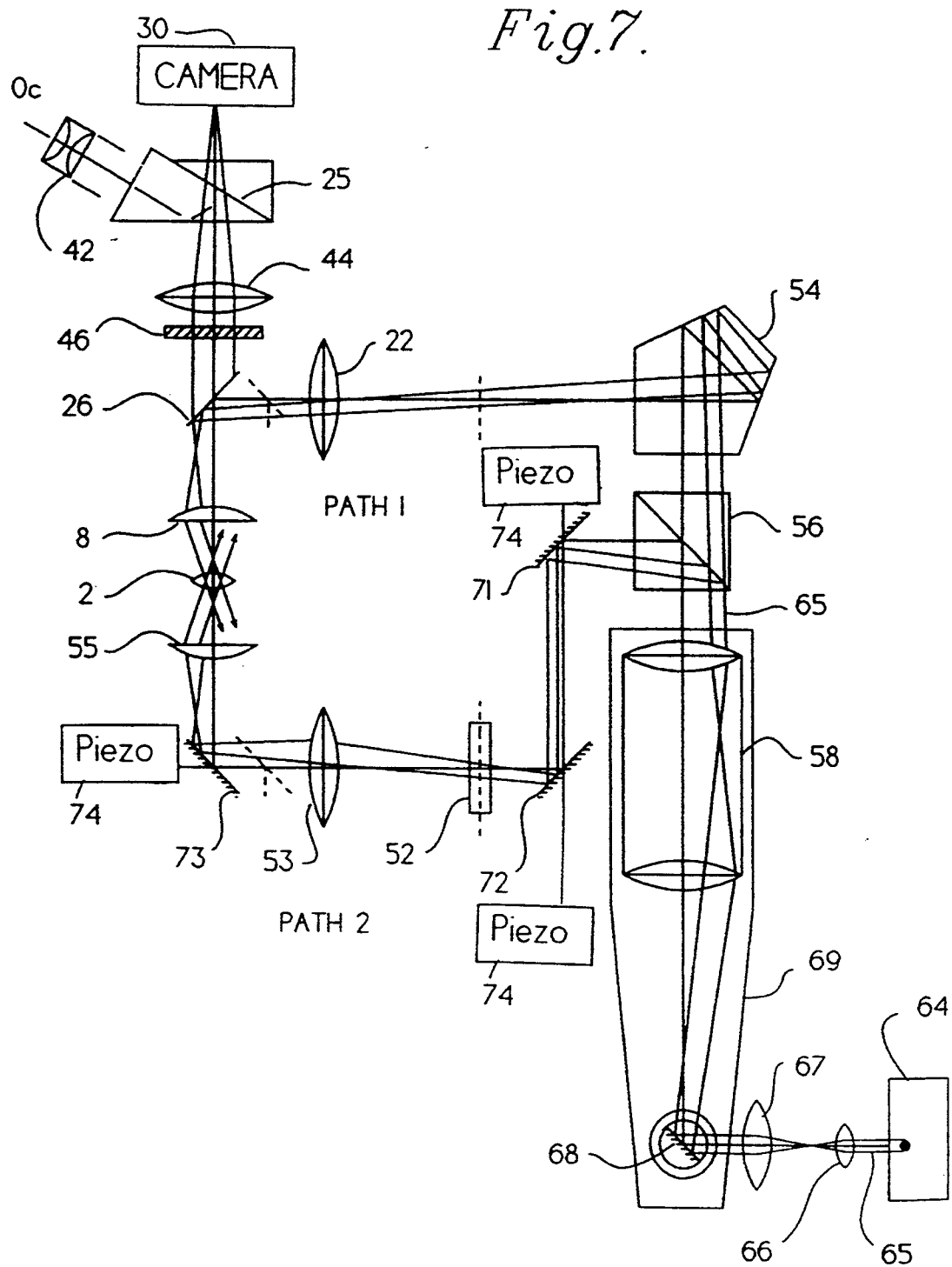
FIG. 7 is a schematic diagram of the second preferred embodiment of our microscope.

A more versatile Optical system having a laser 64 for a light source was also designed, With objective lenses 8 and 55 positioned on opposite sides of the specimen (FIG. 7). A prism splitter 56 is used to amplitude-divide the expanded beam, so that a low divergence gaussian enters the specimen 2 independently from each side. Since the coherence length of a 1 m ion laser is only about 30 mm, the two beam paths in the microscope are typically matched to within 5mm. A piezoelectric drive 74 on a mirror 72, 73, 74 in one beam path serves to adjust the phase, in this case mirror movement being a full wavelength per cycle of the standing wave field. One advantage of the two beam system is that unaberrated wavefronts enter the specimen on both sides, compared to the mirror system where phase errors accumulate on both passes when the specimen refractive index is heterogeneous. The second advantage of this configuration is that by sweeping the beam angle ($\theta$) in the specimen, standing wave fields of different spatial period can be time-multiplexed in the specimen during the acquisition of a single image. The advantage of this is described below.

The two-beam system provides the means for excitation field synthesis (EFS). The microscope operates like an OSM system, in that fluorescene images of the specimen are recorded in an electronic camera as the specimen is stepped through the focal plane. It differs from OSM in that for each image, the specimen will be excited by a continuous sequence of standing wave fields that differ in axial node spacing, but all with an antinode located at the focal plane of the microscope. The sequence of fields is generated by sweeping the beam crossing angle during excitation of the specimen. For every field in the sequence, fluorescence will be excited maximally at the focal plane. Away from this plane, the phases of each field differ, so that the excitation intensity averaged over all fields in the sequence will be less. Optionally, a second fluorescence image can then be recorded with the same sequence of standing wave fields, except that each is adjusted to have a node at the focal plane. In this case, fluorescence will be excited minimally at the focal plane, but at similar averaged levels away from it. Digital pixel-by-pixel subtraction of the nodal image from the antinodal image gives a result for which the effective excitation field is peaked at the geometric focal plane, but decays to zero above and below this plane.

Figure 8:
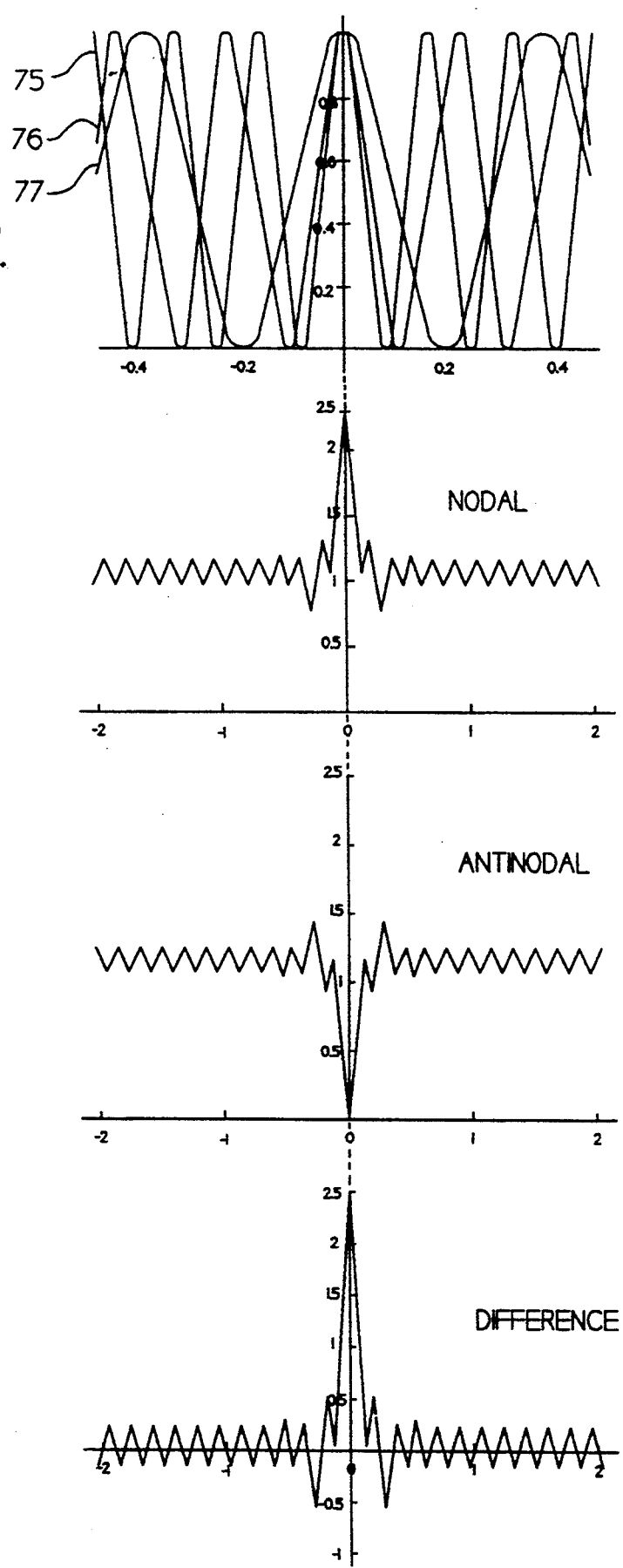
FIG. 8 is a graph of overlapping light beams having different nodal spacings.

In practice, the sequence of standing wave fields can be generated by sweeping the beam-crossing angle $\theta$ through the full range accessible within the aperture of the objective lens and condenser. For a water-immersion system having a numerical aperture of 1.2, for example, the range is $\pm 64°$. The synthesized field for the antinodal image will then be $$I_{EFS}(Z) = \int_{-\theta_m}^{\theta_m} \frac{1}{2} \{1 + \cos[K_o z \cos \theta]\} d\theta$$

$$= \theta_m(1 + J_o(K_o z)) + \sum_{n=1}^{\infty} (-1)^{n-1} \frac{\sin 2n \theta_m}{n} J_{2n}(K_o z)$$

$$= 1.12(1 + J_o(K_o z)) + 0.78 J_2(K_o z) + 0.49 J_4(K_o z) + 0.15 J_6(K_o z) - 0.10 J_8(K_o z) - 0.19 J_{10}(K_o z) - 0.13 J_{12}(K_o z) - 0.01 J_{14}(K_o z) + \ldots$$

where $K_o = 4\pi n/\lambda$. For the nodal image, only the constant term does not change sign, so that the difference image is weighted by the sum of the Bessel terms. This sum is peaked at the focal plane, and decays to zero in an oscillatory manner above and below it (FIG. 8). For an idealized optical system in which the numerical aperture is equal to the specimen refractive index (NA =n, $\theta m=90°$), the weighting of the difference image is simply $J_o(K_oZ)$.

The effect of field synthesis on the OTF can be illustrated directly. Fourier transformation of the above equation gives $$I_{EFS}(k_z) = \begin{cases} 2\pi\theta_m\delta(k_z), & |k_z| < K_o\cos\theta_m \\ \pi/\sqrt{K_o^2 - k_z^2}, & K_o\cos\theta_m < |k_z| < K_o \\ 0, & |k_z| > K_o \end{cases}$$

which is a piecewise discontinuous function of axial spatial frequency. $I_{EFS}(k_z)$ is convolved with the OSM OTF to give the EFS OTF. Therefore, it can be seen that for an EFS system operating within the aperture of existing high-NA objective lenses, the OSM OTF gets expanded piecewise into an extended axial spatial frequency band. The EFS OTF has the same transverse limit as in OSM, but is significantly extended axially. Purely axial wave vectors with frequencies in the range of $K_o\cos\theta_m$ to $K_o$ are recovered directly, and the bandpass limit extends beyond this for near-axial wave vectors.

DESCRIPTION OF THE PREFERRED EMBODIMENTS

The present invention utilizes intersecting beams to create a standing wave pattern. Several methods for creating such a pattern are described in U.S. Pat. No. 4,621,911. FIG. 1, which was taken from that patent, shows the intersection at a fluorescent or phosphorescent specimen of two coherent, collimated, monochromatic beams of light, A and B, of a wavelength suitable for excitation of fluorescence or phosphorescence in the specimen. Rays A represent the propagation of a collimated beam (plane waves) that makes an angle $\theta$ with the optical axis of the microscope. Rays B represent the propagation of a second collimated beam that makes an angle $180°-\theta$ with the optical axis, and is coplanar with A and the optical axis.

Figure 2:
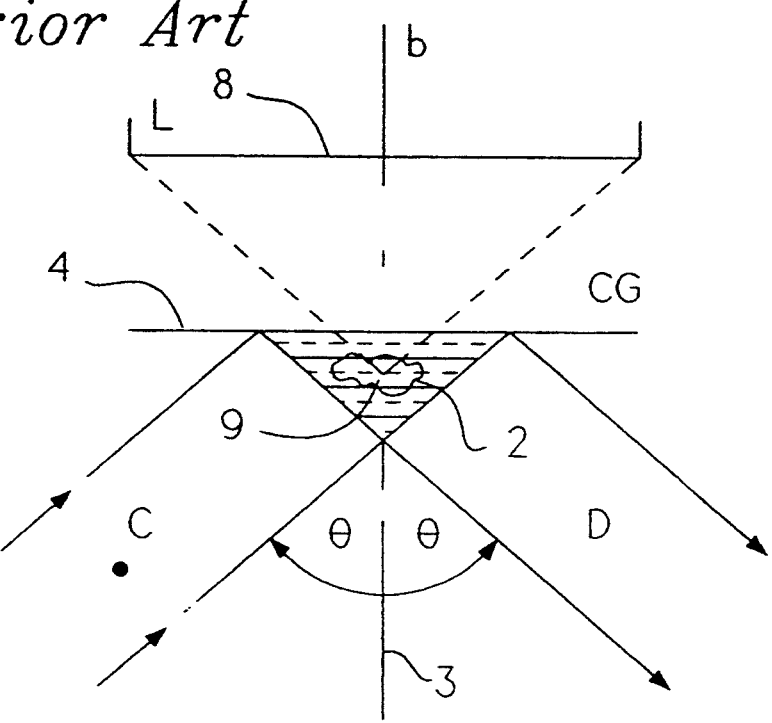
FIG. 2 is a schematic representation illustrating the formation of a standing wave field by total internal reflection of an incident beam from a cover glass.

It is also possible to create a standing wave pattern using reflection so that the reflected beam intersects the incident beam. This technique is illustrated in FIG. 2. A sufficiently coherent light source (not shown) directs a collimated beam C which passes through the specimen 2. That beam strikes the cover glass 4 and is reflected as collimated beam D. Since beams C and D are s-polarized and intersect, a standing wave pattern 6, indicated by dotted lines, is formed. The microscope lens 8 is positioned so that its focal point 9 in focal plane 10 is within the standing wave pattern in the specimen.

When both beams A and B or C and D make the same angle $\theta$ with respect to the optical axis of the microscope, as shown in FIGS. 1 and 2, the antinodal and nodal planes of the standing waves are parallel to the focal plane. Therefore, fluorescence will be excited in the specimen in laminar zones that show the axial structure of the object. This can be most clearly seen in FIG. 3.

Figure 3:
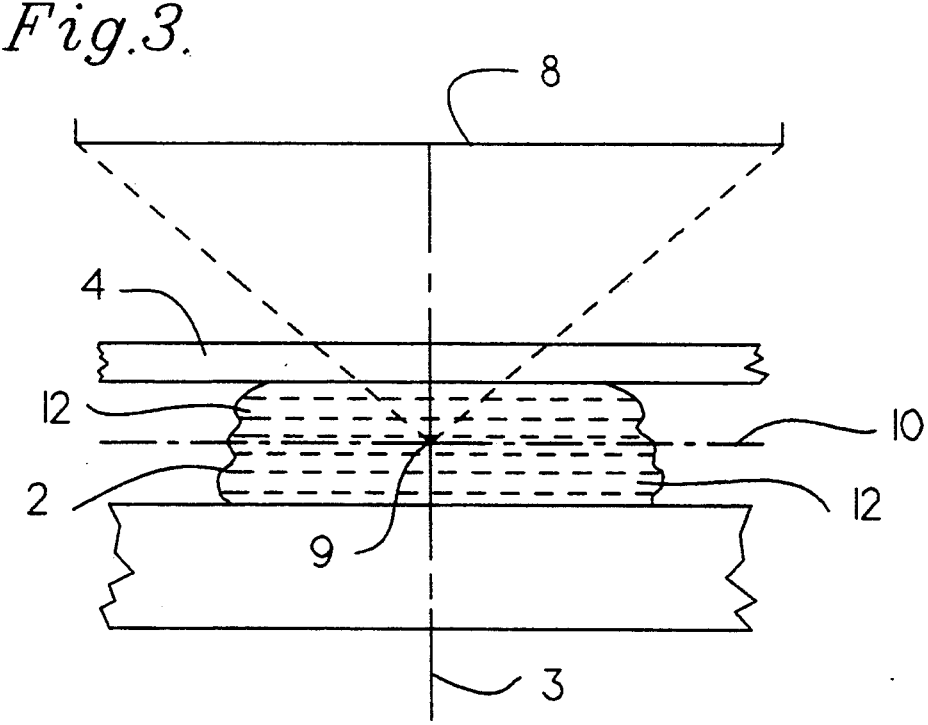
FIG. 3 is a side view of a specimen placed in the object focal plane of a microscope.
Figure 5:
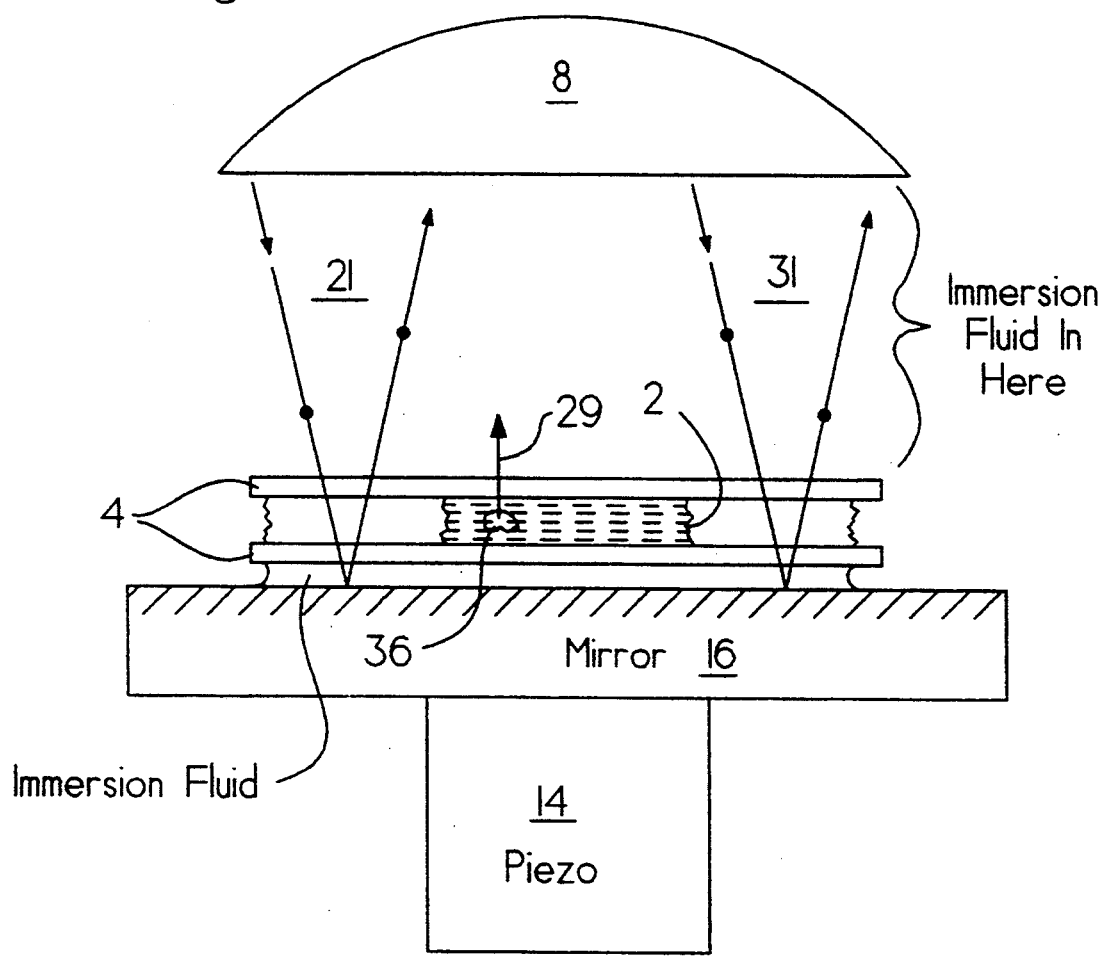
FIG. 5 is an enlarged view of the specimen being illuminated in the microscope of FIG. 4.

A side view of the specimen 2 mounted on a glass slide 6 is shown in FIG. 3. The specimen 2 is under a cover glass 4. The microscope lens 8 is positioned so that the object focal plane 10 is within the specimen 2. If the specimen is illuminated in the manner shown in FIGS. 1 or 2 a series of laminar zones 12 will be created within the specimen. The node spacing ($\Delta S$) of the excitation field varies with changes in the wavelength ($\lambda$) of the beam and its angle ($\theta$) relative to the optical axis 3. That is, $(\Delta s)=\lambda/2n \cos \theta$ which is a minimum of $\lambda/2n$ at $\theta=0°$. The relative position of the nodes and the specimen can be varied at constant node spacing by shifting the phase of one of the beams. In practice, total internal reflection was utilized to fold one beam at the cover glass 4 so as to set up a standing wave as shown in FIG. 2. In the method of FIG. 5, $\theta$ is limited by the lens system to a maximum value of $\theta_m=\sin_{-1} NA/n'$. In the system of FIG. 2, $\theta$ is limited by a minimum value equal to the critical angle at the cover glass 4.

Figure 4:
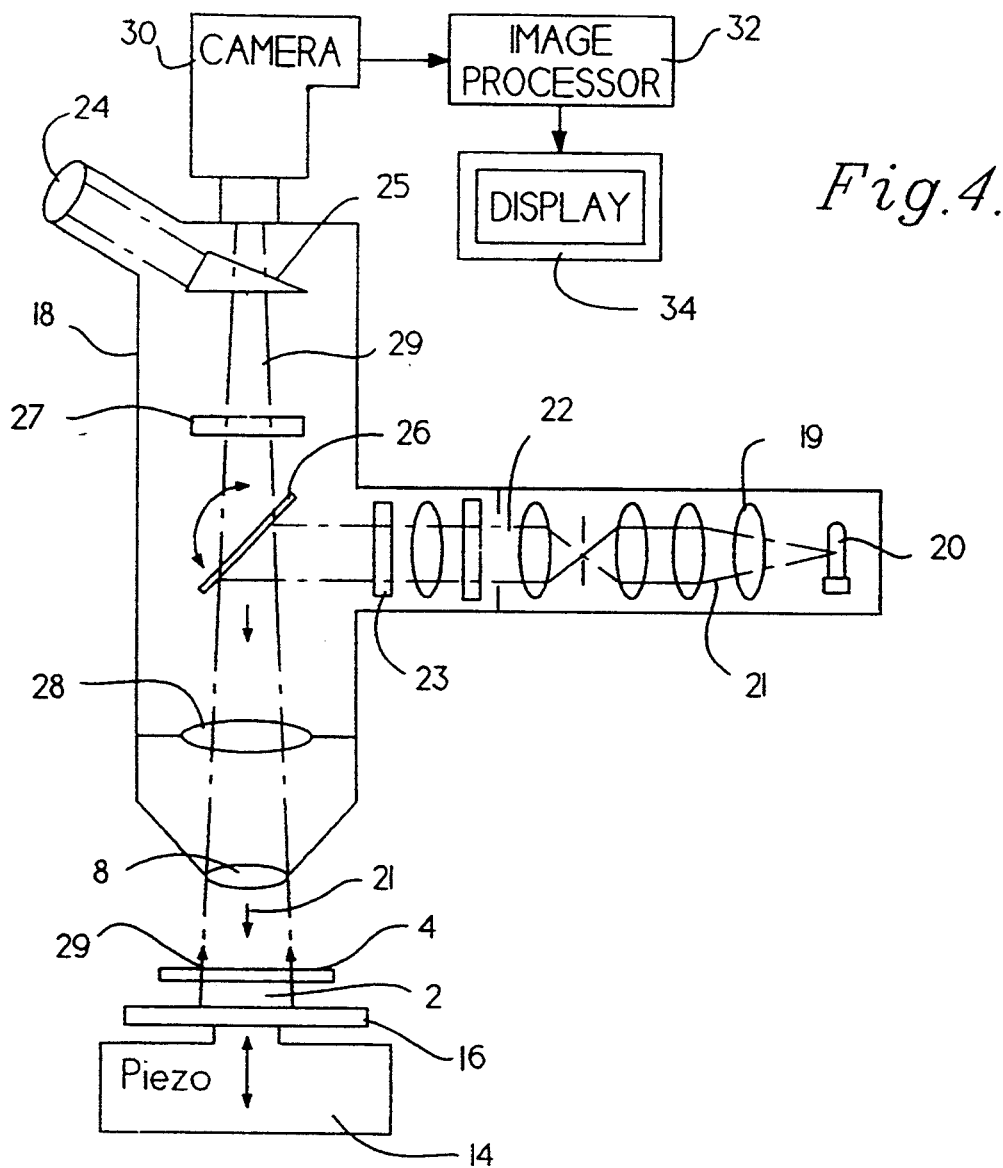
FIG. 4 is a diagram showing a first present preferred embodiment of our improved standing wave microscope.

Many cells can be tagged with a dye that is excited by green light to fluoresce red; so we can use a green laser for our light source. For other dyes we may also use blue, red, yellow and even ultraviolet lasers. As shown in FIG. 4 it is also possible to use an incoherent light source 20 such as a high pressure mercury lamp with a beam collimator 19, polarizer 22 and bandpass excitation filter 23. For the microscope 18 shown in FIG. 4 the imaging system is comprised of lenses 8 and 28, dichroic reflector 26, emission filter 27, beam splitter 25, eyepiece 24, camera 30, image processor 32 and display 34. Light source 20 emits a light beam 21 which is expanded s-polarized and collimated. Then the beam is reflected by dichroic reflector 26. Green light passes through lenses 28 and 8, cover glass 4 and specimen 2 until it is reflected by mirror or phase conjugator 16. This causes a standing wave pattern shown in FIG. 5 to be created in the specimen. The incident and reflected green light beams also cause luminescent tags within the specimen to emit red light 29. Emitted red light passes from the specimen through lenses 8 and 28 and through dichroic filter 26 and emission filter 27 and is directed by beam splitter or reflector 25 to eyepiece 24 or camera 30 or both. An electronic camera 30 with image processor 32 and display 34 records and displays an image. The display could be a cathode ray tube or film.

Referring to FIG. 5, the incident beam 21 of green light passes through the cover glass and specimen and is reflected by reflective surface 17 of mirror 16 as reflected beam 31. The intersecting incident beam 21 and reflected beam 31 create a standing wave pattern within the specimen. Furthermore, this light causes luminescent tag 36 within the specimen 2 to emit red light indicated by beam 26. The red light 26 is then directed to the camera image processing unit and display as shown in FIG. 4. The optics are adjusted so that a gaussian beam 21 exiting the objective 8 contracts slightly to a large-diameter waist (150$\mu$m) at the reflective surface 17 of the mirror 16 which is preferably 0.1–0.2 mm beyond the specimen 2. The standing wave field is then created by the superposition of the gaussian field and its reflection. In this condition, the nodal surfaces of he unperturbed standing wave field, although curved in principle, are flat to better than 1part in 20,000 over the field of view.

Figure 6:
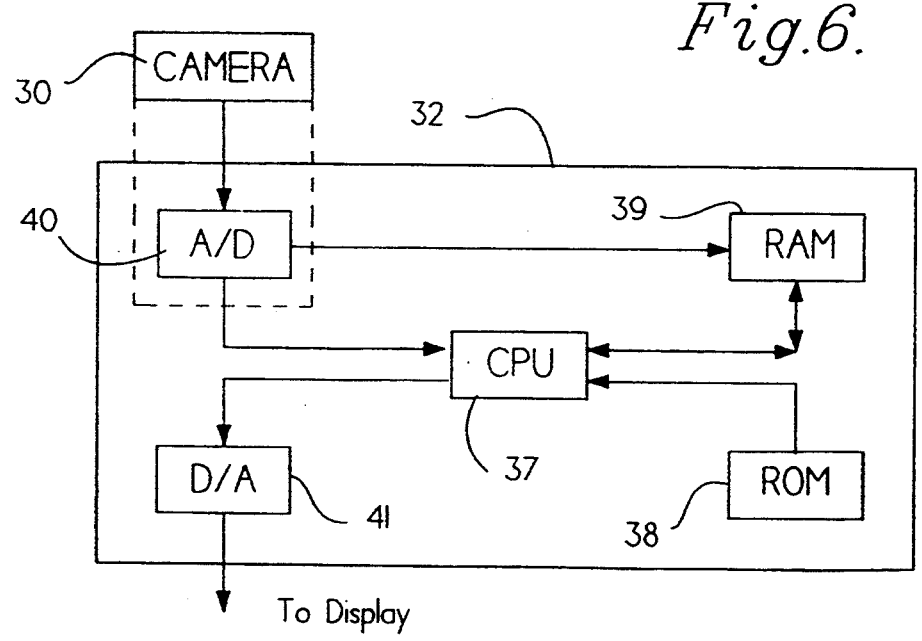
FIG. 6 is a block diagram of a image processor used with the microscope of FIG. 4.

The image which is created from the emission of light 29 by the luminescent tag 36 can be enhanced using known image processing technology. That image can be further improved using the methods described herein. Therefore, the image processor 32 should include a central processing unit 37, read only memory 38, and a random access memory 39 as indicated by FIG. 6. Normally, the image will be digitized using an A/D converter 40 in the image processor 32 or in the camera 30. The digital image is enhanced by the central processing unit 37 according to a program in memory 38. Both the original and enhanced images can be stored in memory 39. The enhanced image is converted to analog form by D/A converter 41 for display.

A more versatile optical system with objective lenses positioned on opposite sides of the specimen is diagrammed in FIG. 7. A laser 64 emits a light beam 65 which passes through beam expander 66 and lens 67 to pivotable mirror 68 and a scan system 69 for field synthesis. The scan system 69 contains a movable scan mirror 68 and telescope 58. The beam 65 is split by beam splitter 56. A portion of the light is directed by mirrors 71, 72 and 73 through phase control 52, tube lens 53 and objective 55 through the specimen 2. A second portion of the beam is directed by prism 54, lens 22, dichroic reflector 26 and objective lens 8 through the specimen 2. Light 29 emitted from the specimen 2 passes to camera 30 or oculars 42 through lens 8, dichroic reflector 26, barrier filter 46 and tube lens 44. The beam splitter and prism are used to amplitude-divide the expanded gaussian beam, so that nearly flat wave fronts enter the specimen independently from each side. Since the coherence length of a 1m laser is only about 30 mm, the two beam paths in the microscope are matched to within 5 mm, A piezoelectric drive 74 can be provided on a mirror 71, 72, 73 or dichroic reflector 26 in one beam path to adjust the phase. In this case mirror movement is a full wavelength per cycle of the standing wave field. One advantage of the two beam system is that unaberrated wavefronts enter the specimen on both sides, compared to the mirror system of FIG. 5 where phase errors accumulate on both passes when the specimen refractive index is heterogeneous. The second advantage of the configuration of FIG. 7 is that by sweeping the beam angle ($\theta$) in the specimen, such as by rotation of mirror 68, standing wave fields of different spatial period can be time-multiplexed in the specimen during acquisition of a single image. If this is done while keeping an antinode fixed at the object focal plane, sweeping provides a means for synthesizing a nonperiodic excitation field peaked at the in-focus plane of the specimen.

The devices shown in FIGS. 4 thru 7 are particularly useful for two methods of specimen imaging. In one method, the specimen 2 is excited by a time-multiplexed sequence of standing wave fields that differ in axial node spacing. This generates a set of wave patterns which if superimposed would look like the upper graph of FIG. 8. There three waves 75, 76, 77 indicated by solid, dotted and chain lines are shown. By superimposing a set of standing wave fields having different node spacing, but all having an antinode at the focal plane in the specimen an effective field that is peaked at the focal plane can be synthesized.

Therefore, for every field in the sequence, fluorescence will be excited maximally at the focal plane. Away from this plane, the phases of each field differ, so that the excitation intensity averaged over all fields in the sequence will be less. Optionally, a second fluorescence image can then be recorded with the same sequence of standing wave fields, except that each is adjusted to have a node at the focal plane. In this case, fluorescence will be excited minimally at the focal plane, but at similar averaged levels away from it. Digital pixel-by-pixel subtraction of the nodal image from the antinodal image gives a result for which the effective excitation field is peaked at the geometric focal planes, but decays at zero above and below the plane. The sum of a series of curves, such as the curves 75, 76 and 77, is shown in the bottom graph of FIG. 8. In practice, the sequence of standing wave fields can be generated by sweeping the beam-crossing angle $\theta$ through the full range accessible within the aperture of the objective lens and condenser by use of scan mirror 68.

Figure 9:
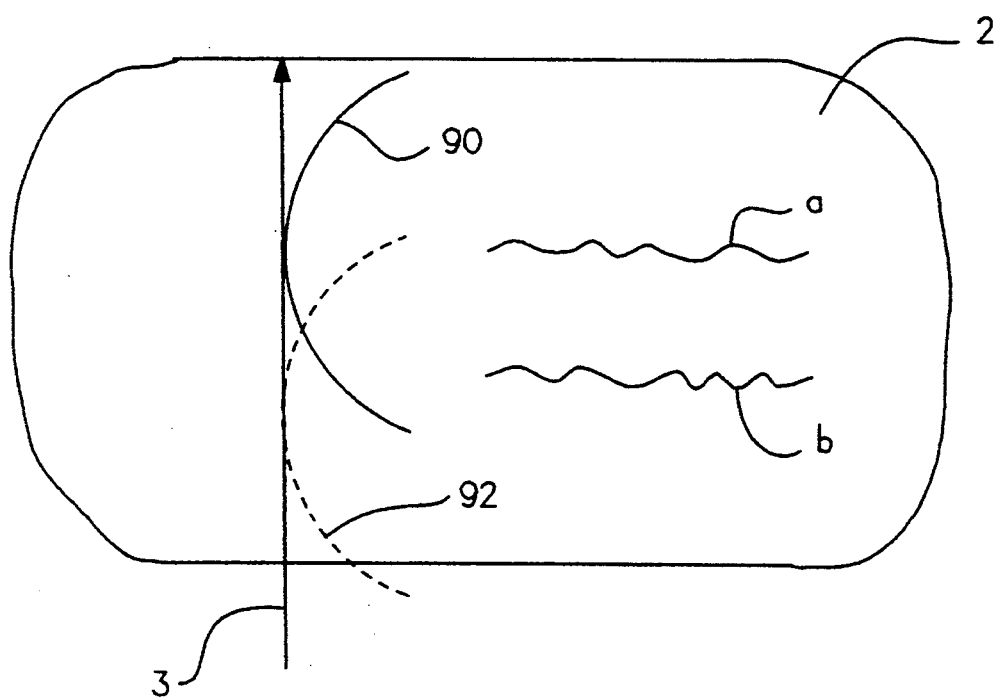
FIG. 9 is a graph illustrating movement of the nodal plane for optical subsectioning.

FIG. 9 illustrates optical subsectioning. A specimen 2 has tagged objects a and b. In the first case 90, a nodal plane is made coincident with object "a", so that the image will show the fluorescence of "b". In the second case 92, the node has been shifted to the axial location of "b", so that a second image will then show "a". The process can be easily extended to three or more close stratified objects, with the result that a series of images are obtained which contain linear combinations of contributions from each stratum. Linear digital processing can then be used to extract images corresponding to each stratum.

Two problems with standing wave fluorescence microscopy were immediately evident in our early work. First, the use of total reflection in the illuminator was convenient, but precluded the use of high-aperture immersion lenses. Second, as described, the standing wave data set consisted of a large number of images for each specimen focal plane position, since both $\theta$ and $\Phi$ could be varied. This made the method impractically slow. The present methods and apparatus of excitation field synthesis reduce the data set to one or two images per focal plane, by multiplexing different standing-wave fields.

With the beams counter propagating on axis ($\theta = 0°$), and an excitation wavelength of 514.5 nm, the node spacing in the specimen was determined robe equal to $\lambda/2n$ in both the mirror and crossed beam systems. In the first case, mirror movement of 0.17 $\mu$m corresponds to a shift of one fringe. In the two beam system, external mirror movement of 0.514 $\mu$m had the same effect.

The standing-wave microscope was used to view cytoskeletal actin fibers in fixed 3T3 fibroblast cells. Cells were grown at a low density on 40 mm cover glasses, fixed permeabilized, stained for F-actin with rhodamine-phalloidin, and mounted in a thin film of medium with a second cover glass on top. In the mirror system the specimens were oil-immersed to both the objective and the mirror. In the two-beam system, oil-immersion lenses were used on both sides of the specimen. With the standing-wave field adjusted for maximum fringe flatness, the laminar pattern of fluorescence excited in the specimen could be easily seen as contour-like rings resulting from the intersection of the planar antinodes with the mound-like volume occupied by the cytoskeleton. This was visible in even highly-flattened cells in which the cytoskeleton was entirely in sharp focus. By shifting the fringe position, different sets of fibers could alternatively be made to fluoresce. In certain cases, this type of contrast reversal was caused by reflector movement corresponding to a fringe displacement of 0.04–0.05 $\mu$m. From the direction of fringe displacement, and known orientation of the specimen, the axial order of distinguishable features could be inferred.

A comparison of standing wave to uniform excitation was made by blocking one path in the microscope immediately after the beam splitter. In this case, cytosketetal fibers in all parts of the specimen fluoresce, and refocusing affected nearly all distinguishable features equally, imparting little 3d information with the interference restored, regions of the cell coincident with antinodes become approximately 4×brighter and nodal regions nonemissive. An image of the same cell by confocal scanning fluorescence microscopy showed less discrimination between sets of actin fibers that show up in different standing wave images.

Although we have described and illustrated certain present preferred embodiments of our method and apparatus for field synthesis and optical subsectioning for standing wave microscopy, it should be understood that our invention is not limited thereto, but may be variously embodied within the scope of the following claims.

We claim:

1. An improved optical microscope for observing a luminescent specimen placed on a stage, such optical microscope being of the type having a light source, a lens which defines a focal plane which is a fixed distance from the lens, a stage for holding the specimen in the focal plane and means for producing a standing wave field through the specimen to excite fluorescence or phosphorescence in the specimen wherein the improvement comprises:
   a) a means for exciting the specimen by a time-multiplexed series of standing wave fields that together sum to form one of a non-periodic excitation field that is peaked at an in-focus plane in the specimen and a non-periodic excitation field that is hulled at an in-focus plane in the specimen; and
   b) means for recording an image of the specimen when the specimen is so excited.

2. An improved optical microscope of claim 1 wherein the light source is a laser.

3. An improved optical microscope for observing a luminescent specimen placed on a stage, wherein the specimen is between two microscope lenses, such optical microscope being of the type having a light source, a lens which defines a focal plane which is a fixed distance from the lens, a stage for holding the specimen in the focal plane and means for producing a standing wave field through the specimen to excite fluorescence or phosphorescence in the specimen wherein the improvement comprises:
   a) a means for exciting the specimen by a time-multiplexed series of standing wave fields;
   b) means for recording an image of the specimen when the specimen is so excited;
   c) a beam splitter; and
   d) lens system;
and wherein the light source is positioned to create two coherent light beams one beam passing through each microscope lens and the beams crossing in the specimen.

4. The improved optical microscope of claim 3 wherein the lens system includes a movable scan mirror to sweep the beams through the specimen so that the beams cross at equal angles.

5. The improved optical microscope of claim 1 also comprising a mirror positioned to direct a light beam from the light source and a piezoelectric motor attached to the mirror.

6. The improved optical microscope of claim 1 wherein the means for recording images is an electronic camera.

7. The improved optical microscope of claim 1 also comprising:
   a) a means for incrementally moving the specimen so that after each incremental movement the focal plane will pass through one of several parallel cross-sections through the specimen; and
   b) an image processor for processing and combining a plurality of images to produce at least one combined image of the specimen, and
wherein the means for recording images of the specimen is capable of recording an image of the specimen when the specimen is excited at each incremental position to which the specimen is moved.

8. The improved optical microscope of claim 7 wherein the means for combining the images is comprised of means for digitizing each image, memory for storing digitized images, a processing unit for processing and combining selected digitized images and display means for displaying combined images.

9. The improved optical microscope of claim 8 wherein the display means is one of a cathode ray tube and film.

10. The improved optical microscope of claim 1 also comprising a mirror apposed to the specimen.

11. The improved optical microscope of claim 1 also comprising a phase conjugator apposed to the specimen.

12. The improved optical microscope of claim 1 wherein the light source is an incoherent light source and also comprising a polarizer positioned to s-polarize light beams emitted from the light source, a collimator and a wavelength filter to produce light of sufficient coherence to produce standing waves by interference of two beams of light.

13. A method employing a luminescence optical microscope having an optical axis for obtaining a three dimensional representation of an object comprising:
   a) labeling the object with fluorescent or phosphorescent material;
   b) disposing the object at the optical axis of the microscope;
   c) exciting the specimen by establishing a time multiplexed series of standing wave fields; and
   d) recording an image of the specimen.

14. The method of claim 13 wherein the specimen is excited by generating a continuous series of standing wave fields that differ in node spacings and all standing wave fields have an antinode at a focal plane of the microscope.

15. The method of claim 13 wherein the specimen is excited by generating a continuous series of standing wave fields that differ in node spacings and all standing wave fields have a node at a focal plane of the microscope.

16. The method of claim 15 also comprising the steps of
   a) exciting the specimen by generating a continuous series of standing wave fields that differ in node spacings and all standing wave fields have an antinode at the focal plane of the microscope;
   b) recording a second image of the specimen; and
   c) combining the image and the second image to create a combined image of the specimen.

17. The method of claim 16 wherein the combined image is formed by subtracting the image from the second image.

18. The method of claim 13 wherein the fluorescent or phosphorescent material responds to light of specific wave lengths and wherein the microscope has a light source which emits only that wave length.

19. The method of claim 18 wherein the light source is an incoherent light source and also comprising the steps of collimating, s-polarizing and filtering light beams emitted from the light source.

20. The method of claim 19 wherein the incoherent light source is a white light source and also comprising:
   a) filtering the light beam to permit only those wave lengths of light to pass which excite the fluorescent or phosphorescent material; and
   b) collimating the filtered light beam.

21. The method of claim 13 also comprising:
   a) incrementally moving the specimen so that after each incremental movement the focal plane will pass through one of several parallel cross sections through the specimen;
   b) establishing a time multiplexed series of standing wave fields for each incremental position of the specimen; and
   c) recording at least one image of the specimen for each incremental position.

22. The method of claim 21 also comprising combining selected images for each incremental position of the specimen into a single combined image.

23. The method of claim 13 also comprising enhancing the image by use of an image processor.

24. The method of claim 13 wherein the image is recorded on film.

25. The method of claim 13 wherein the standing wave field has a selected nodal plane and is established by a light beam which is reflected from a mirror and also comprising the step of moving the mirror to cause an axial shift of the selected nodal plane through the specimen.

26. The method of claim 13 wherein the standing wave fields are created using the steps comprising:
   a) generating a light beam from a light source;
   b) expanding the light beam; and
   c) passing the light beam through a prism splitter to amplitude divide the beam so that a low divergence beam enters the specimen independently from opposite sides of the specimen.

27. A method employing a luminescence optical microscope for obtaining a three dimensional representation of an object comprising:
   a) labeling said object with fluorescent or phosphorescent material;
   b) disposing said object at the optical axis of said microscope;
   c) exciting the specimen by establishing a first standing wave field having a nodal plane coincident with a stratum through the specimen;
   d) recording a first image of the specimen;
   e) moving the nodal plane a selected distance to null any fluorescence from a neighboring stratum;
   f) recording a second image of the specimen; and
   g) combining the first image and the second image.

28. The method of claim 27 wherein the first image and the second image are combined by image processing.

29. The method of claim 27 also comprising:
   a) moving the nodal plane a desired number of times and over a selected distance to null any fluorescence from a neighboring stratum;
   b) recording at least one subsequent image of the specimen after moving the nodal plane; and
   c) combining at least two images of the specimen selected from the group of images comprising the first image, the second image and subsequent images.

30. The improved optical microscope of claim 1 also comprising a means for exciting the specimen by a standing wave field having one nodal plane within the specimen which can be precisely shifted among selected positions.

* * * * *